United States Patent [19]

Hoskinson, deceased

[11] 4,329,842
[45] May 18, 1982

[54] POWER CONVERSION SYSTEM UTILIZING REVERSIBLE ENERGY OF LIQUEFIED NATURAL GAS

[75] Inventor: Robert L. Hoskinson, deceased, late of Pacific Palisades, Calif., by Violet Vivian Hoskinson, heir

[73] Assignee: Hans D. Linhardt, Newport Beach, Calif.

[21] Appl. No.: 165,378

[22] Filed: Jul. 2, 1980

[51] Int. Cl.³ ............................ F02C 7/00; F17C 7/02
[52] U.S. Cl. .................................. 60/39.46 G; 60/648; 60/727; 60/728; 62/52
[58] Field of Search .................. 60/648, 726, 727, 728, 60/39.46 R, 39.46 G; 62/52

[56] References Cited

U.S. PATENT DOCUMENTS 3,293,850  12/1966  Morrison ............................... 60/648
3,978,663   9/1976  Mandrin et al. ...................... 60/728
3,992,891  11/1976  Pocrnja ............................. 60/648 X

FOREIGN PATENT DOCUMENTS

52-109782  3/1977  Japan .

Primary Examiner—Allen M. Ostrager
Attorney, Agent, or Firm—Jackson, Jones & Price

[57] ABSTRACT

A power conversion system comprising a combination of a liquefied natural gas vaporizing plant and a fuel burning power generating facility is disclosed. The liquefied natural gas vaporizing plant utilizes the cryogenic capacity of the liquefied natural gas to produce liquid air which is pumped to a high pressure by a liquid air pump. The liquid air is then brought into a heat exchanging relationship with air drawn into the vaporizing plant so that the high pressure liquid air is converted to high pressure gaseous air. The high pressure gaseous air which represents recovered reversible energy of the liquefied natural gas is fed into a combustion chamber of the fuel burning power generating plant. Since the power generating facility requires no significant output of power to drive a compressor to compress ambient air prior to its entry into the combustion chamber, the power generating facility is operated at a high efficiency.

23 Claims, 5 Drawing Figures

FIG. 1

POWER CONVERSION SYSTEM UTILIZING REVERSIBLE ENERGY OF LIQUEFIED NATURAL GAS

BACKGROUND OF THE INVENTION

1. Field of the Invention

The present invention is directed to a power conversion system which utilizes reversible energy contained in liquefied natural gas. More particularly, the present invention is directed to a combination of a fuel burning power generating plant and a large scale liquefied natural gas vaporization plant wherein reversible energy contained in the liquefied natural gas is utilized for generation of power.

2. Description of the Prior Art

Power generating plants of the prior art include a combustion chamber wherein a fuel such as natural gas, liquid hydrocarbons or coal mixed with air is burned to generate hot gaseous combustion products at high pressure. The hot gaseous combustion products are directed to drive a turbine producing rotating shaft power which is available to perform useful work such as turning an electric generator.

It has been known in the art for a long time that in order to obtain acceptable performance of the turbine, the incoming air must be compressed to a relatively high pressure prior to actual combustion of the fuel in a combustion chamber of the turbine. Accordingly, state-of-the-art power generating plants include a compressor which pressurizes the incoming air. The compressor is usually driven by the rotating shaft power of the turbine. It is well known in the art that the power input of the compressor usually consumes approximately ⅔ of the rotating shaft power produced by the turbine. Thus, the efficiency of the above described state-of-the-art power generating plants based on theoretical heat content of the fuel is necessarily limited to approximately 33% by the large power input requirement of the compressor.

Relatively recently, transoceanic transportation of liquefied natural gas has gained increasing socio-economic and technological acceptance. At the present, numerous facilities wherein liquefied natural gas is unloaded from ships and is converted to gaseous form for distribution in pipelines or for storage in a storage facility, are contemplated or are under construction. In its liquid state, the natural gas represents a substantial amount of reversible energy. It is generally recognized that approximately 300 KW (Kilowatt) of energy is required to liquefy 1.0 million standard cubic foot (MMSF) of natural gas per day. Approximately 120 KW of this energy is reversible. Therefore, in an ideal recovery system approximately 120 KW of energy may be extracted from each MMSFD of liquefied natural gas while the same is vaporized.

The presence and nature of this reversible energy in liquefied natural gas is well understood by those skilled in the engineering arts and particularly in the science of thermodynamics and does not require elaborate explanation in the present disclosure. Nevertheless, for the sake of a clear understanding and appreciation of the present invention the nature of this reversible energy is briefly explained as follows. According to basic laws of thermodynamics whenever a temperature differential exists between two bodies, useful work may be theoretically obtained in a process wherein heat is transferred from the warmer body to the colder body. The theoretical efficiency of this process is determined by the equation:

$$\eta = \frac{T_2 - T_1}{T_2}$$

wherein "$\eta$" is a dimensionless number and $T_1$ represents the temperature of the colder body expressed in absolute degrees, and $T_2$ represents the temperature of the warmer body expressed in absolute degrees.

Thus, the significant temperature differential between the liquefied natural gas which is customarily transported at approximately −260° F. and at atmospheric pressure, and the ambient environment represents a significant source of recoverable energy. According to presently prevailing practice in the art, liquefied natural gas is vaporized in heat exchangers which utilize large amounts of sea water as a source of heat. In this process sea water, which is cooled below its original temperature by the liquefied natural gas, is simply pumped back into the ocean thereby totally wasting the reversible energy contained in the liquefied natural gas.

In recognition of the wasteful nature of the above described method of vaporizing liquefied natural gas, several processes have been devised in the prior art to capture at least a portion of the reversible energy of the liquefied natural gas.

In one relatively simple process described in U.S. Pat. No. 3,438,216, liquefied natural gas is vaporized by exchange of heat with a large quantity of air. The air is cooled in the process to about 0° F. This cold air is introduced into a compressor which is associated with and driven by a fossil fuel powered turbine. Since compression of cold air requires less power than compression of warm air, the amount of power taken by the compressor from the turbine is decreased as compared to a compressor utilizing air of ambient temperature. Accordingly, some of the reversible energy of the liquefied natural gas is utilized in this process. In other words, the efficiency of the gas turbine is increased because less power derived from the combustion of the fossil fuel is diverted for driving the compressor. Hot exhaust gases of the turbine are then utilized in a heat exchanger to bring the vaporized natural gas to a temperature of approximately 60° F. The natural gas is then released for distribution in a pipeline.

In a variation of the process described in U.S. Pat. No. 3,438,216, ambient air is cooled to approximately −120° F. in a heat exchanger wherein the liquefied natural gas is vaporized. Air at approximately −120° is then fed into the compressor which is associated with and driven by a fossil fuel powered gas turbine.

In still another process of the prior art, which is commonly known in the art as a "Closed Brayton Cycle" or "Lotepro/Linde Cycle", a portion of the reversible energy contained in the liquefied natural gas is captured in the following manner. An inert gas such as nitrogen is utilized in a first heat exchanger to vaporize liquefied natural gas. The cooled inert gas is introduced into a compressor driven by a turbine. The compressed, cold inert gas is then led into a second heat exchanger where it is preheated by hot exhaust of the turbine. The compressed inert gas is led from the second heat exchanger into an externally fired heater wherein it is brought to a high temperature and pressure and thereafter is released to drive the turbine. From the turbine, the expanded but still hot inert gas is introduced into the second heat exchanger wherein it preheats the compressed and cold inert gas.

Additional disclosures relating to use of a cryogenic liquid such as liquid oxygen or liquefied natural gas in power conversion systems are found in U.S. Pat. Nos. 3,775,976; 3,134,228 and 3,621,656.

As is well known by those skilled in the art, the above described processes for capturing the reversible energy of liquefied natural gas have not gained wide practical acceptance. This is probably due to the following. The amount of reversible energy of the liquefied natural gas which is actually captured by these prior art processes, at least until the present, did not appear to justify the expense of providing a relatively complex power generating facility associated with a liquefied natural gas vaporizing facility and adapted for capturing this reversible energy.

The present invention is directed to a power conversion system of high efficiency which greatly increases the economic acceptability of capturing the reversible energy of liquefied natural gas in a power generating facility associated with a liquefied natural gas vaporization plant.

SUMMARY OF THE INVENTION

It is an object of the present invention to provide a liquefied natural gas vaporization plant and a power generating facility operatively associated with said plant which is adapted for efficiently capturing the reversible energy contained in the liquefied natural gas.

It is another object of the present invention to provide a liquefied natural gas vaporization plant and a power generating facility operatively associated with said plant which is adapted for capturing the reversible energy contained in the liquefied natural gas and for generation of useable power on the order of several hundred megawatts.

It is still another object of the present invention to provide a liquefied natural gas vaporization plant and a power generating facility operatively associated with said plant wherein reversibly energy contained in the liquefied natural gas is recovered in a manner capable of adapting to various fluctuation in demand for natural gas and electric power.

It is yet another object of the present invention to provide a liquefied natural gas vaporization plant and a magnetohydrodynamic power generating facility operatively associated with said plant wherein reversible energy contained in the liquefied natural gas is recovered and wherein conditions are favorable for operation of the magnetohydrodynamic power generating facility.

These and other objects and advantages are attained by a system having a liquid air generating plant which draws ambient air and liquefied natural gas. The liquid air generated in the liquid air generating plant is pumped to a high pressure, and is fed back into the liquid air generating plant.

First and second heat exchanger trains included in the liquid air generating plant vaporize the liquefied natural gas by the heat of the air drawn into the plant and also generate high pressure gaseous air from the liquid air by further using heat of air drawn into the plant.

The high pressure gaseous air is preheated in a third heat exchanger or regenerator. The third heat exchanger utilizes hot exhaust gases of a power generating device such as a gas turbine which is operatively associated with the liquid air generating plant. The preheated, high pressure gaseous air is then fed into a combustion chamber of the power generating device wherein introduction and subsequent combustion of a suitable fuel generates high pressure hot gases. The high pressure hot gases drive the power generating device and generate useable power. The useable power includes a very significant portion of the reversible energy contained in the liquefied natural gas.

The objects and features of the present invention are set forth in the appended claims. The present invention may be best understood by reference to the following description taken in connection with the accompanying drawings in which like numerals indicate like parts.

DESCRIPTION OF THE PREFERRED EMBODIMENT

The following specification taken in conjunction with the drawings sets forth the preferred embodiment of the present invention. The embodiment of the invention disclosed herein is the best mode contemplated by the inventor for carrying out his invention in a commercial environment, although it should be understood that various modifications can be accomplished within the scope of the present invention.

Figure 1:
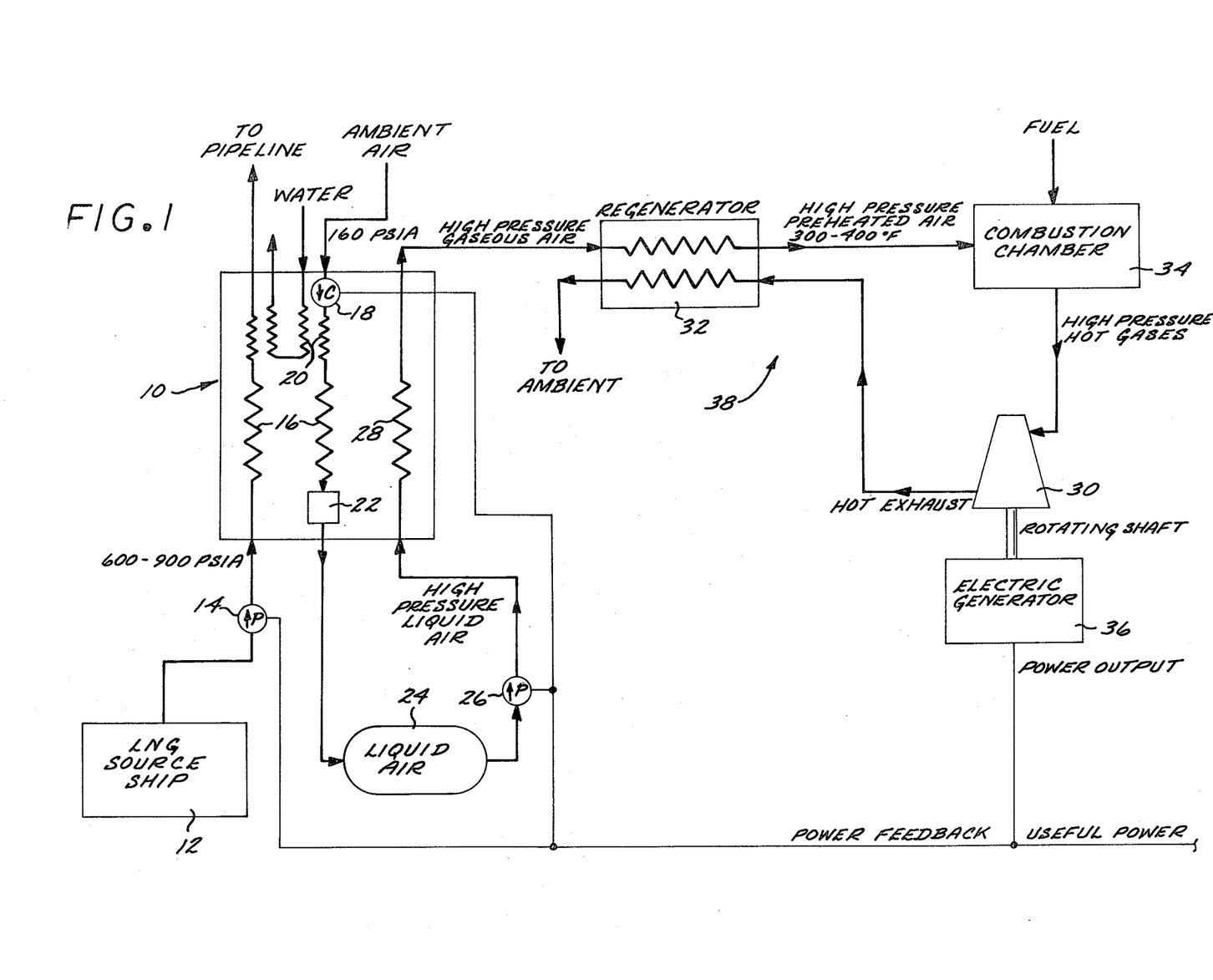
FIG. 1 is a schematic representation of a preferred embodiment of the liquefied natural gas vaporizing and power generating system of the present invention.

Referring now to the drawing figures and particularly to the schematic view of FIG. 1, a preferred embodiment of the liquefied natural gas vaporizing and power generating system is disclosed. The system includes a liquid air generating plant 10 which produces liquid air and vaporized natural gas. Therefore, in the context of the present specification the terms liquid air generating plant and liquefied natural gas vaporizing plant are used substantially interchangeably.

The vaporizing plant 10 draws liquefied natural gas (LNG) from a source wherein the liquefied natural gas is maintained at approximately −260° F. and at atmospheric pressure. It is contemplated within the context of the present invention that the liquefied natural gas vaporizing and power generating system of the present invention is constructed at a seaside port facility wherein ships transporting large quantities of liquefied natural gas are unloaded. Consequently, the entire system may be designed to be capable of unloading and vaporizing several billion standard cubic feet of natural gas per day.

Liquefied natural gas is pumped from the source 12, such as the ship schematically shown on FIG. 1, into the liquid air generating plant 10 by a suitable pump 14. The pump 14 transports the liquefied natural gas and increases its pressure to approximately 600–900 PSIA. As is well known in the art, after vaporization natural gas is usually released for distribution in a pipeline at that pressure. Since the pump 14 pressurizes a liquid its power requirement is relatively small.

After its pressure has been increased to approximately 600–900 PSI the liquefied natural gas is introduced into a first heat exchanger 16 which comprises a part of the liquid air generating plant 10. Therein it is vaporized by absorbing heat of large quantities of ambient air which is driven into the liquid air generating plant 10 by an auxiliary compressor 18. The auxiliary compressor 18 increases the pressure of ambient air to approximately 300 PSIA (20 atm). The power input of the auxiliary compressor 18 is provided by feeding back a fraction of the power generated by the entire system. An auxiliary heat exchanger 20 removes the heat of compression from the air before it enters the liquid air generating plant 10 proper. The auxiliary heat exchanger 20 may, as a matter of routine engineering design choice, utilize water or ambient air as a heat absorbing fluid. In the preferred embodiment the auxiliary heat exchanger 20 cooperates witht the auxiliary compressor 18 to provide isothermal compression with high efficiency. The rejected heat may be utilized by heating the natural gas before its release into the pipeline, and/or for heating gaseous air that eventually leaves the liquid air generating plant 10.

In the liquid air generating plant 10 the indrawn air is liquefied utilizing the cooling power of the liquefied natural gas. As it is well appreciated by those skilled in the art a liquid air generating plant is a complex system which may include several heat exchanger trains expanders, reservoirs and valves return lines, etc. For the purpose of disclosing the present invention, however, it is not deemed necessary to describe the liquid air generating plate 10 in detail because construction of the same is well within the current state of the art. The heat exchanger 16 and an expander schematically shown in FIG. 1 as 22 is intended to symbolize the aggregation of the complex structure which is necessary to produce liquid air.

It is important to emphasize for the purpose of appreciating the present invention, however, that the external power requirement of the herein described liquid air generating plant 10 is quite low. This is because spontaneous vaporization of the liquefied natural gas absorbs a large portion of the heat content of the indrawn air. Furthermore, as it will become apparent from the ensuring description, liquid air is not removed from the liquid air generating plant 10. Instead, liquid air, after it is pressurized in the hereinafter described manner, is used to refrigerate more gaseous air while the high pressure liquid air becomes vaporized. Thus, the net result of the processes occuring in the liquid air generating plant 10 are vaporization of LNG and production of high pressure cold gaseous air. Clearly, sufficient refrigerating power is available in the liquid air generating plant 10 to bring about this result without the use of substantial amounts of externally supplied power. It is contemplated on the basis of basic engineering calculations that approximately 3–5 lbs. of liquid air are generated in the plant 10 for each pound of liquefied natural gas which is vaporized in the plant 10.

Still referring to FIG. 1, a liquid air reservoir 24 and a liquid air pump 26 wherein liquid air 26 is pressurized to approximately 3000 PSIA, are shown.

As it is again well appreciated by those skilled in the art, the power input requirement of the liquid air pump 26 is quite small. The importance of this small power requirement of the liquid air pump 26 is especially striking when it is compared to a power requirement of air compressors (not shown) of the prior art which pressurize ambient air prior to introduction of the air into a traditional gas turbine. As it was described in the introductory section of the present patent specification, such compressors usually consume approximately ⅔ of the rotating shaft power of a gas turbine used in traditional power generating systems. Accordingly, pressurizing the air in liquid state prior to its introduction into a power generating facility which is associated with the liquified natural gas vaporizing plant 10, comprises an important feature of the present invention.

Liquid air under high pressure is returned from the liquid air pump 26 into the liquid air generating plant 10 wherein the liquid air is vaporized by exchanging heat with incoming gaseous air. A heat exchanger train wherein vaporization of the high pressure liquid air occurs is schematically shown in FIG. 1 as 28 and is hereinafter referred to as the second heat exchanger train 28. Thus, air drawn into the liquid air generating plant 10 by the auxiliary compressor 18 is cooled by the liquefied natural gas, and also by the high pressure liquid air which is reintroduced into the plant 10 by the liquid air pump 26.

The high pressure gaseous air which exits from the liquid air generating plant 10 represents the captured reversible energy of the liquefied natural gas. This high pressure gaseous air is heated in a third heat exchanger to approximately 300°–400° F. by hot exhaust gases of a prime mover such as a turbine 30 schematically shown in FIG. 1, on a Diesel engine. The third heat exchanger is indicated on the schematic view of FIG. 1 as a regenerator 32.

A combustion chamber 34 is located downstream of the regenerator 32. A suitable fuel is introduced together with the high pressure, preheated air into the combustion chamber 34 wherein the fuel is ignited and combusted. Hot, high pressure gaseous products of the combustion drive the turbine 30. The regenerator 32, the combustion chamber 34, the turbine 30 and an associated electric generator 36, which is driven by the turbine 30, together comprise a power generating plant or facility 38.

Since the power generating facility 38 is adjacent to, and associated with the liquefied natural gas vaporizing plant 10, the fuel used for combustion conveniently comprises natural gas. However, other fuels such as liquid hydrocarbons, various alcohols, coal, and coal gasification products may also be used, the scope of the present invention not being limited by choice of the fuel. As it was indicated above, the still hot, but expanded exhaust gases of the tubine 30 are introduced into the regenerator 32 to preheat the high pressure gaseous air. Finally, the exhaust gases exiting from the regenerator 32 may be released into the environment. In certain embodiments of the liquefied natural gas vaporizing and power generating system of the present invention the exhaust gases may be led through a suitable anti-pollution clean-up system (not shown) prior to their release into the environment.

Rotating shaft-power of the turbine 30 drives the electric generator 36 which generates electric energy. As is shown in FIG. 1, part of this energy is used (feedback) to satisfy the external power consumption of the liquid air generator plant 10. More specifically, energy obtained from the turbine 30 is used to power the liquefied natural gas pump 14, the auxiliary compressor 18 which is required for the operation of the liquid air generating plant 10, and the liquid air pump 26. This energy may be transmitted in the form of rotating shaft power, or in the form of electrical power as a matter of engineering design choice. However, in sharp contrast with prior art power generating plants there is no requirement for a compressor to compress gaseous air prior to its introduction into the combustion chamber 34 of the turbine 30.

As it was pointed out in the introductory section of the present patent specification, the power requirement of such an air compressor consumes approximately ⅔ of the power generated by a turbine. It will be readily appreciated by those skilled in the art that the several power consuming devices of the liquid air generating or liquefied natural gas vaporizing plant 10 require much less power than the beforementioned air compressor of the prior art power generating plants. Consequently, the efficiency of the power generating plant 38 based on the theoretical heat or B.T.U. content of the fossil fuel consumed in the plant 38 is greatly increased. Stated in other words, the useful power input of the turbine 30 includes in addition to power derived from the combustion of the fossil fuel, the captured reversible energy of the liquefied natural gas.

More specifically, it should be readily apparent to those skilled in the art on the basis of the above description that the overall energy requirement of the liquid air generating plant 10 significantly reduced because vaporization of liquefied natural gas absorbs a large portion of the heat of the incoming ambient air. Furthermore, because it takes relatively little energy to compress a liquid as compared to the energy required for compression of a gaseous substance, neither the liquefied natural gas pump 14 nor the liquid air pump 26 require large inputs of power. On the basis of this qualitative analysis alone, the increased overall efficiency of the power generating and liquefied natural gas vaporizing system readily becomes apparent.

In order to further illuminate the efficiency of the above described power generating and liquefied natural gas vaporizing system of the present invention, reference is had to the temperature-entropy diagrams of FIGS. 2-5. In these diagrams temperature (T) of the air and of the natural gas flowing through the system is plotted on the vertical (Y) axis while corresponding entropy (S) of the same materials is plotted on the horizontal (X) axis. In order to obtain a relatively clear and simple treatment of the phase and temperature-entropy changes of the materials, i.e. air and natural gas, the following simplifications or assumptions are made in the construction of the temperature-entropy diagrams.

The vapor-liquid phase change of air and of natural gas is respectively contracted into one point independently of the pressure of each of these substances. Respective temperature-entropy curves for air and for liquefied natural gas at given constant pressures are shown overlapping with one another. Finally, compression of air in the auxiliary compressor 18 and expansion of air in the turbine 30 are ideally shown to be isentropic processes.

As it will be readily appreciated by those skilled in the art, the above described assumptions comprise a reasonable approximation of a power cycle such as the one described in the present patent specification. This is because combustion occurs at a high temperature, compressor work is done at ambient temperature, and pump work is performed on a liquid and is therefore relatively small. Accordingly, the hereinafter discussed simplified temperature-entropy diagrams provide a useful tool for evaluating the energy balance of the overall system described in the present patent specification.

Figure 2:
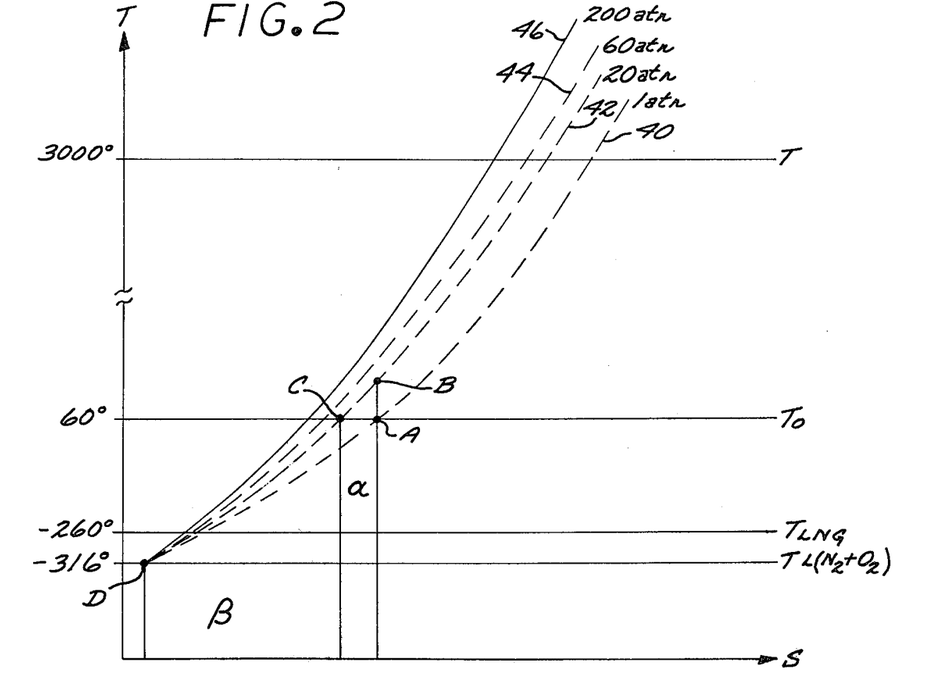
FIG. 2 is a simplified temperature entropy diagram showing temperature and entropy changes of air as the air is being drawn into and liquefied in the liquefied natural gas vaporizing plant of the present invention.

Referring now particularly to FIG. 2, the temperature-entropy change of the incoming air is illustrated as the air is compressed in the auxiliary compressor 18 from atmospheric pressure to approximately 300 PSI (20 atm). Since this process is ideally an isentropic process, the compression is illustrated by a straight vertical line interconnecting points A and B respectively lying on curves 40 and 42. As the heat of compression is removed from the compressed air in the auxiliary heat exchanger 20, temperature of the air is reduced to ambient temperature (approximately 60°–70°) along the curve 42 corresponding to 20 atmosphere pressure. Point C on curve 42 corresponds to the state of the air just prior to being brought into a heat exchanging relationship with the liquefied natural gas and liquid air. The measure of energy input ideally required to bring the air into this state or in other words the work of compression, is the area lying below curve 42 between points B and C. This area is further indicated by the reference character α.

Still referring to FIG. 2, the temperature-entropy change is shown in the step wherein the air is liquefied. The state of the liquefied air, having an approximate boiling point of −316° F. at 1.0 atmosphere pressure is shown by point D in FIG. 2. The measure of energy input ideally required to bring air into the state represented by point D from the state represented by point C is the area lying below curve 42 between points C and D. This area bears the reference character β.

It should be noted at this point that although the pressure of air is allowed to decrease from approximately 20 atm to approximately 1 atm in the process of liquefication, an error introduced into measuring the requisite energy input by measuring the area below curve 42, is negligible. This is because of the relatively close proximity of the curves 40 and 42 respectively corresponding to 1 and 2 atmosphere pressures in the low temperature range. Thus, a total amount of energy ideally required to liquefy ambient air is represented by the area lying below points B–D on curve 42, which is an aggregate of areas α and β.

Figure 3:
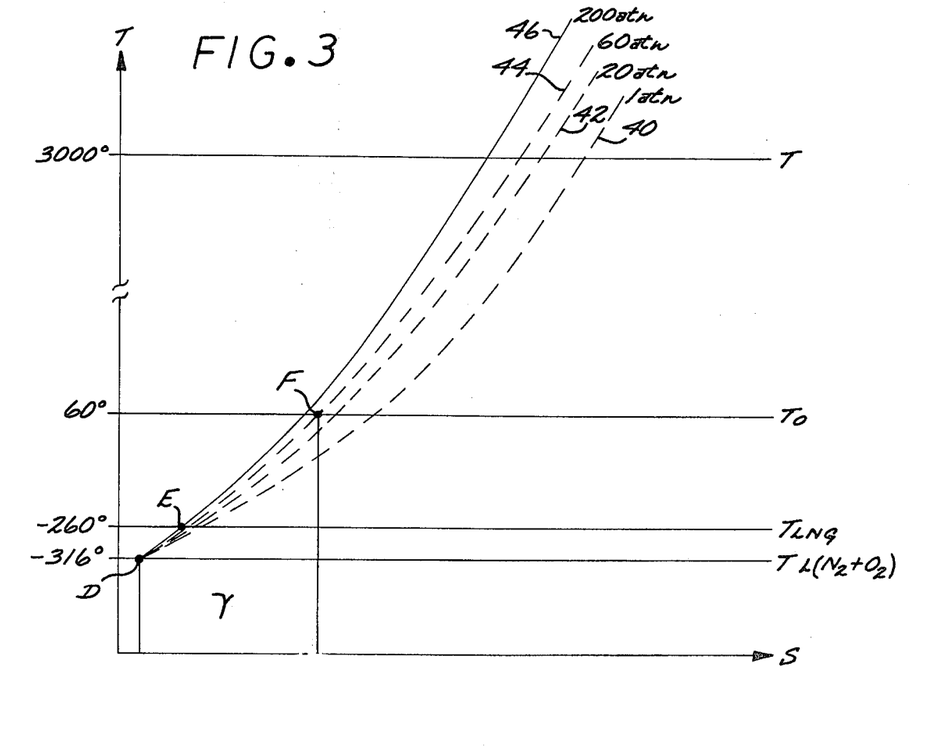
FIG. 3 is a simplified temperature-entropy diagram showing temperature and entropy changes of liquefied natural gas as it is drawn into and vaporized in the liquefied natural gas vaporizing plant of the present invention.

Referring now to FIG. 3, temperature-entropy change of the natural gas is shown as the natural gas is vaporized in accordance with the present invention. The state of liquefied natural gas at approximately −260° F. and 1 atm pressure is represented by point E. As the liquefied natural gas is compressed to approximately 600–900 PSI (40–60 atm) pressure, its entropy is changed only negligibly. Therefore, the compressed state of the liquefied natural gas is still practically represented by point E, and the amount of energy required to operate the pump 14 is negligible.

Evaporation of the liquefied natural gas in the first heat exchanger 16 while its pressure is maintained at approximately 60 atm brings the natural gas into the state represented by point F on curve 44. The energy change in this process is measured by the area lying below curve 44 between points E and F. This area also bears the reference character γ.

Figure 4:
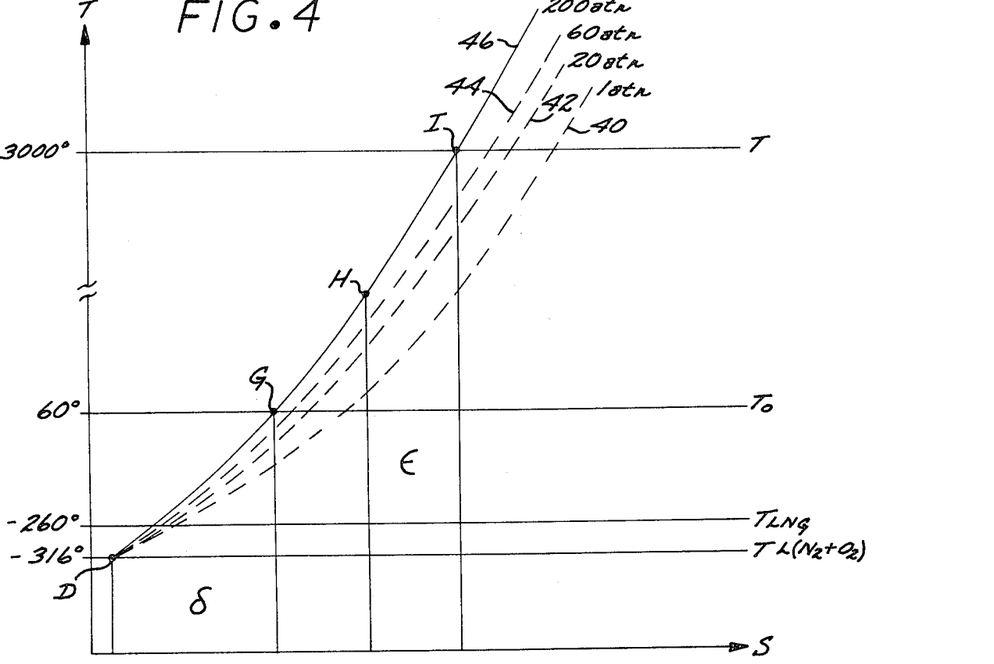
FIG. 4 is a simplified temperature-entropy diagram showing temperature and entropy changes of air as it is brought from a liquefied state to ambient temperature at high pressure in the liquefied natural gas vaporizing plant of the present invention, the diagram also showing temperature entropy changes of the air as it is heated by combustion of a fossil fuel in a power generating facility of the present invention.

Referring now to FIG. 4, the temperature-entropy change of the air in the liquid air pump 26 and in the second heat exchanger 28 wherein the air is again vaporized and brought to ambient temperature, is shown. The state of the liquid air at approximately −316° F. and at one atmosphere is represented by point D. As the liquid air is pressurized to approximately 3000 PSI (200 atm) its entropy is changed only negligibly and the energy required to operate the liquid air pump 26 is sufficiently small so as to be negligible. Thus point D also represents the state of the liquefied air at 3000 PSI (200 atm) pressure.

Evaporation of the liquid air in the second heat exchanger 28, while its pressure is maintained at approximately 200 atm, brings the air into a state which is represented ideally by point G lying on curve 46 in FIG. 4. The amount of energy released in the process of evaporation, or more strictly speaking, the amount of energy available to refrigerate incoming ambient air, is measured by the area lying below curve 46 between points D and G. This area also bears the reference character δ.

Referring still to FIG. 4, the temperature-entropy change of the high pressure air is shown as the fuel mixed with the air is combusted in the combustion chamber 34. In this step, the high pressure air is brought from approximately 300°–400° F. to approximately 3000° F., although the exact temperature of the combustion products is a matter of engineering design choice. Points respectively corresponding to the just described states of the high pressure air on curve 46 are designated H and I. The area lying below curve 46 between points H and I, having the reference character ε, measures the amount of energy ideally available to drive the turbine 30. This amount of energy, of course, corresponds to the theoretical heat or BTU content of the fuel burned in the combustion chamber.

Figure 5:
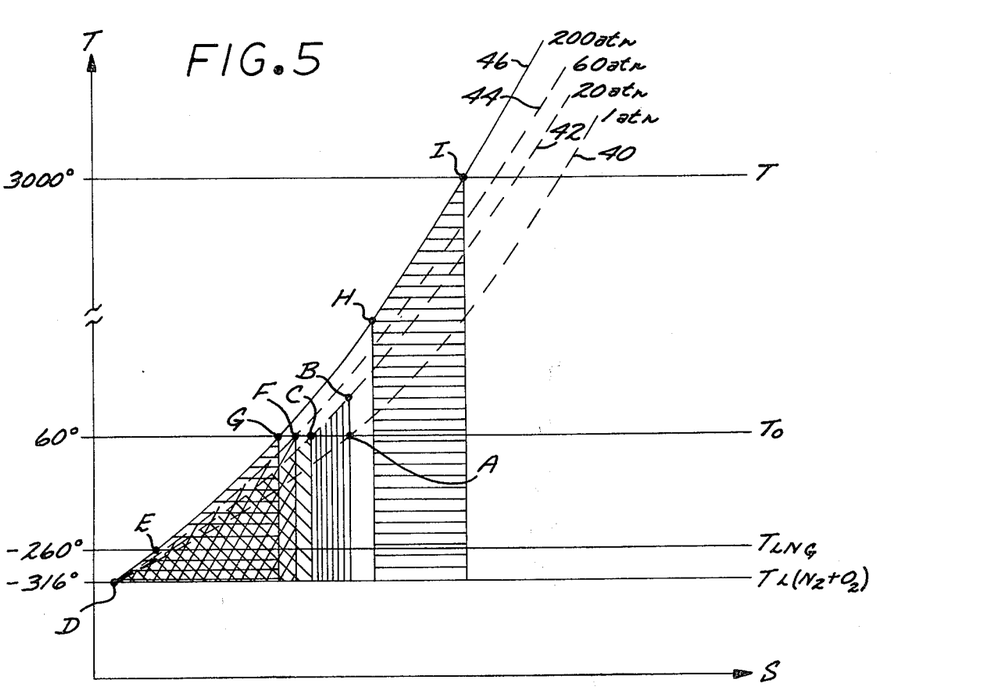
FIG. 5 is a simplified temperature-entropy diagram summarizing the temperature entropy changes and thereby showing an energy balance of the processes shown on FIGS. 2, 3 and 4.

The energy balance of the entire system is graphically summarized on FIG. 5. Because portions of the areas α, β, γ, δ, and ε lying below the −316° temperature line in the modified temperature-entropy diagrams are unimportant for the purpose of obtaining an energy balance, these portions are not shown on FIG. 5. Thus, the area α shaded with vertical lines, represents the work of compression and the area β, shaded with leftward ascending slanted lines represents the work required for liquifying air. The areas γ and δ respectively shaded with rightly ascending slanted and horizontal lines represent work available when the liquefied natural gas and liquified air are vaporized, respectively. Finally area ε, also shaded with horizontal lines, ideally represents the energy content of fuel burnt in the combustion chamber 34.

It is apparent from FIGS. 2, 3, 4, and 5 that the work or refrigerating power obtained by vaporization of LNG and liquid air is as much, or more than the work required to bring air from approximately 60° and 20 atmosphere to liquid state and 1 atm pressure. Stated in an other way:

$$\gamma + \delta \geq \beta$$

Therefore, the only work which needs to be supplied by feeding back power from the turbine 30 is that required to run the auxiliary compressor 18, i.e. α.

Therefore an ideal efficiency of the system may be calculated as follows:

$$\eta = \frac{\epsilon - \alpha}{\epsilon} = 1 - \frac{\alpha}{\epsilon}$$

Since even in a practical system, the work of compression α is relatively small compared to the work ε obtained in the turbine 30, the efficiency (η) may approach or even exceed 70%.

It is contemplated that in a liquefied natural gas vaporizing facility constructed in accordance with the present invention and having a capacity of sending out 1.0 billion standard cubic feet of natural gas per day 1000 megawatts of useable send-out power may be obtained by combusting of about 12% of the sent-out natural gas with the entire system operating at apporximately 72% efficiency.

In addition to high efficiency the liquefied natural gas vaporizing and power generating system of the present invention also offers the following advantages. Liquid air may be stored in the reservoir 24 shown on FIG. 1 when demand for natural gas exceeds demand for electric power. The stored liquid air may be made available for production of high pressure gaseous air in order to meet a surge in demand for natural gas. Thus, the system is capable of conforming, at least to the extent made possible by the storage capacity of the liquid air reservoir 24, to independent fluctuations in demand for natural gas and electric power without loss of the reversible energy contained in the liquefied natural gas.

Furthermore, the air introduced into the combustion chamber 34 of the turbine 30 at approximately 3000 PSI is at a much higher pressure than is usually obtainable by conventional air compressors associated with gas turbines of the prior art. The highly pressurized air introduced into the combustion chamber 34 in accordance with the present invention further contributes to the increased efficiency of the herein described power generating facility 38 as compared to prior art power generating systems.

Moreover, it is possible in accordance with established techniques in the art, to generate high pressure oxygen enriched air in the liquid air generating plant of the present invention. Availability of unusually high pressure (3000 PSI) oxygen enriched air for introduction into a combustion chamber creates a very favorable condition for magnetohydrodynamic power generation. As is well known in the art, magnetohydrodynamic power generators require unusually hot combustion products which are difficult to produce by prior art combustion techniques. Combustion of a fossil fuel mixed with high pressure oxygen enriched air produced in accordance with the present invention readily provides gaseous combustion products of approximately 5000° F. These are very well suited for use in magnetohydronamic power generators. Accordingly, in alternate embodiments of the liquefied natural gas vaporizing and power generating system of the present invention, the turbine 30 and associated electric generator 36 may be replaced by a magnetohydrodynamic power generating assembly.

As a still further alternative, the high pressure air which is obtained from the liquid air generating plant 10, may be utilized in a large Diesel engine in which Diesel fuel is used for combustion. Very large Diesel engines capable of utilizing the energy stored in the high pressure air in conjunction with the burning of fuel may be readily constructed according to state-of-the-art technology. In this case the diesel engine is strictly operating as a gas expansion engine without the requirement of compression strokes. Therefore, a highly efficient power conversion method is available by modifying standard high power output ship diesel engines for the purpose of being integrated in the invention.

What has been described above is a liquefied natural gas vaporizing and associated power generating system which offers several advantages including an ability to effectively recover the reversible energy contained in liquefied natural gas. Several modifications of the present invention may become readily apparent to those skilled in the art in light of the above disclosed generic concepts. Accordingly, the scope of the present invention should be interpreted solely from the following claims.

What is claimed is:

1. A power generating system adapted for recovering reversible energy contained in liquefied natural gas, the system comprising in combination:
   liquid air generating means for liquefying air supplied to the liquid air generating means from the ambient environment;
   first heat exchange means included in the liquid air generating means for exchanging heat of the air supplied into the liquid air generating means with liquefied natural gas thereby vaporizing the natural gas for release into a pipeline, storage tank and the like;
   a pump pressurizing the liquid air to a high pressure;
   second heat exchange means included in the liquid air generating means for exchanging heat of the ambient air with liquid air and for generating high pressure gaseous air from the liquid air, and
   power generating means for receiving the high pressure gaseous air and a supply of fuel and for combusting the fuel thereby generating useable power, said useable power including a significant portion of the reversible energy contained in the liquefied natural gas.

2. The invention of claim 1 further comprising third heat exchange means for exchanging heat of hot exhaust gases of the power generating means with the high pressure gaseous air prior to said high pressure gaseous air being fed into the power generating means.

3. The invention of claim 2 further comprising an air compressor and cooling means for compressing ambient air and after compression cooling the same to reject the heat of compression prior to said compressed air being fed into the liquid air generating means.

4. The invention of claim 3 wherein the power generating means includes a gas turbine coupled to means for generating electricity.

5. The invention of claim 4 wherein a portion of the power generated by the power generating means is utilized to power the air compressor and the pump which pressurizes the liquid air.

6. The invention of claim 5 wherein the power generating means is adapted for generating power on the order of hundreds of thousands of kilowatts.

7. The invention of claim 3 wherein the power generating means includes a diesel engine coupled to means for generating electricity.

8. The invention of claim 1 wherein the power generating means comprise magnetohydrodynamic power generating means.

9. A system adapted for generating power by combustion of a fuel and by extracting reversible energy contained in large quantities of liquefied natural gas while vaporizing the same, the system comprising in combination:
   liquid air generating means associated with means for drawing ambient air into the liquid air generating means, and with means for drawing liquefied natural gas into the liquid air generating means;
   first heat exchange means included in the liquid air generating means for vaporizing liquefied natural gas with air drawn into the liquid air generating means, the vaporized natural gas being released from the liquid air generating means into a pipeline, storage tank and the like;
   means for pressurizing liquid air to a high pressure;
   second heat exchange means included in the liquid air generating means for vaporizing said high pressure liquid air to generate high pressure gaseous air, said second heat exchange means also being adapted for cooling air prior to said air being liquefied in the liquid air genetating means, and
   a prime mover including a combustion chamber wherein the fuel mixed with the high pressure gaseous air is combusted to generate useable power, said useable power including a significant portion of the reversible energy contained in the liquefied natural gas.

10. The invention of claim 9 further comprising third heat exchange means for exchanging heat of exhaust gases of the prime mover with the high pressure gaseous air generated in the second heat exchange means, said third heat exchange means generating hot, high pressure gaseous air which is utilized in the combustion chamber.

11. The invention of claim 10 wherein the means for pressurizing liquid air is adapted to pressurize the liquid air to approximately 3000 PSI.

12. The invention of claim 11 wherein the second heat exchange means is adapted for generating the high pressure gaseous air at approximately 3000 PSI and approximately 30°–60° F.

13. The invention of claim 12 further including a pump for pressurizing liquefied natural gas to approximately 600–900 PSI prior to its introduction into the first heat exchange means and wherein the first heat exchange means are adapted for generating vaporized natural gas at approximately 50°–60° F.

14. The invention of claim 13 wherein the prime mover is a gas turbine.

15. The invention of claim 13 wherein the prime mover is a diesel engine.

16. In a power conversion system having a power generating device driven by combustion of a fuel and a subsystem for vaporizing liquefied natural gas for release into a pipeline, storage facility and the like, heat content of ambient air being utilized in the subsystem for vaporizing said liquefied natural gas whereby the ambient air is cooled to a substantial extent, said cooled air being ultimately converted into high pressure air and utilized in the power generating device, the improvement comprising:
   first means for generating liquid air from ambient air by use of the cryogenic capacity of the liquefied natural gas;
   pump means for pressurizing said liquid air to a high pressure, and heat exchange means for vaporizing said high pressure liquid air to generate high pressure gaseous air, the heat exchange means cooling ambient air prior to being liquefied by the first means, the high pressure gaseous air representing a substantial portion of the reversible energy contained in the liquefied natural gas.

17. The improvement of claim 16 wherein the pump means are adapted to pressurize the liquid air up to approximately 3000 PSI.

18. The improvement of claim 17 wherein the heat exchange means are adapted for generating air at approximately 3000 PSI and at approximately 30°–40° F.

19. A method of recovering reversible energy of liquefied natural gas, the method comprising the steps of:
utilizing cryogenic capacity of liquefied natural gas to produce liquid air in a liquid air generating plant, the natural gas being vaporized in the process;
pressurizing the liquid air to a high pressure;
returning said highly pressurized liquid air into the liquid air generating plant in a heat exchange relationship with air drawn into the liquid air generating plant from the ambient environment to vaporize said liquid air and to produce high pressure gaseous air, said high pressure gaseous air representing the recovered reversible energy of the liquefied natural gas.

20. The method of claim 17 further comprising the step of utilizing the high pressure gaseous air in the combustion chamber of a fuel powered power generating plant.

21. The method of claim 20 wherein the liquid air is pressurized to at least approximately 3000 PSI pressure.

22. The method of claim 20 further comprising the step of preheating the high pressure gaseous air with hot expanded combustion products exhausted from the power generating plant.

23. The method of claim 20 further comprising the step of pressurizing the liquefied natural gas prior to utilizing the cryogenic capacity of the liquefied natural gas to produce liquid air.

* * * * *